April 22, 1969     J. F. BURCH     3,439,442

SPRING ACTIVATED FISH HOOKS

Filed May 23, 1966

INVENTOR.

Jerry F. Burch

# United States Patent Office 3,439,442
Patented Apr. 22, 1969

3,439,442
SPRING ACTIVATED FISH HOOKS
Jerry F. Burch, 798 N. Buckner Road,
Dallas, Tex. 75218
Filed May 23, 1966, Ser. No. 552,276
Int. Cl. A01k 83/02
U.S. Cl. 43—36                                          5 Claims

ABSTRACT OF THE DISCLOSURE

A fishing device having hooks pivotally and slidably connected to a central rod member and which extend laterally outward in response to a pulling force exerted on the device by a fish. Spring means is included for biasing the hooks to a normally inward position and additional hooks may be provided at the end of the fixed centrol rod member.

---

This invention relates to fishing devices, and more particularly to spring activated fish hooks.

It is therefore the main purpose of this invention to provide fish hooks which are held together under spring tension but are expanded due to the force of a fish striking the bait, thus hooking the fish securely.

Another object of this invention is to provide spring activated fish hooks which are designed to prevent the hooks from becoming extended by accident when it becomes entangled in weeds and other obstructions.

Another object of this invention is to provide spring activated fish hooks which, if desired, may be housed in a lure, which makes it particularly suitable for fishing in waters containing weeds and other obstructions.

Still another object of this invention is to provide spring activated fish hooks which are of rugged construction, corrosion proof, inexpensive to manufacture and provide maximum utility to a fisherman.

Other objects and advantages of this invention will become apparent from a consideration of the following detailed description taken in connection with the accompanying drawing, wherein a preferred embodiment of the invention is shown. However, it is to be understood that the invention is not limited to the details disclosed but includes all such variations and modifications as fall within the spirit of the invention.

Figure 1:
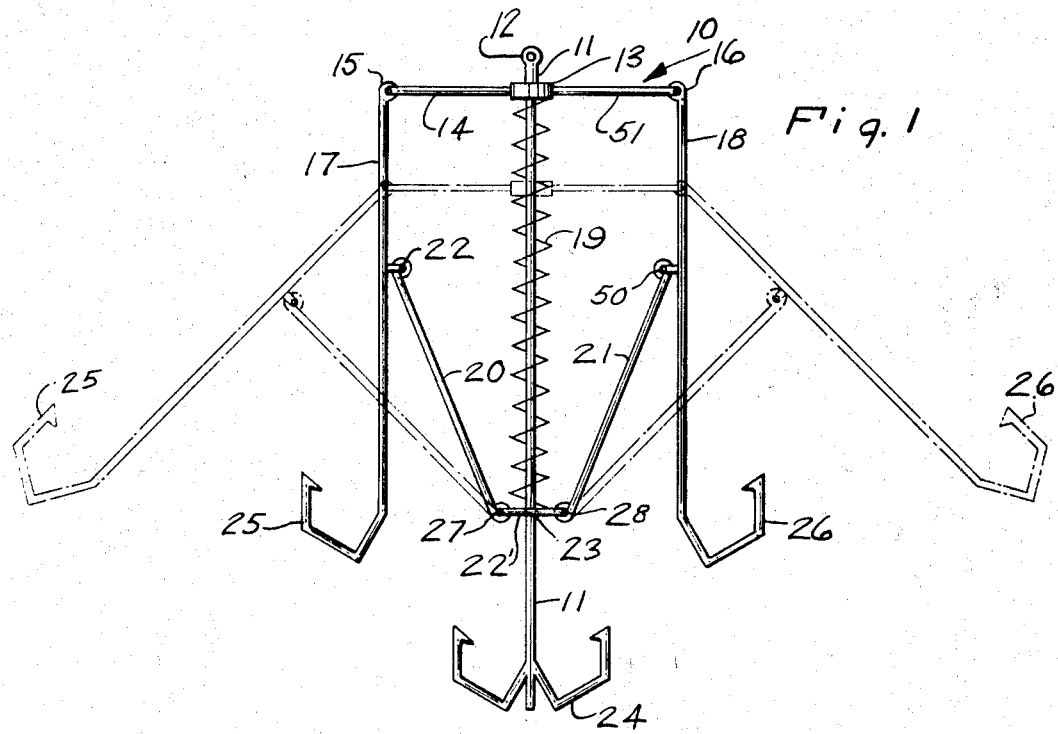
FIGURE 1 is a front elevational view of this invention, phantom lines showing the hooks in their extended position.

According to this invention, a fishing device 10 is provided with a centrally positioned elongated rod 11 which, at one of its ends, is provided with a loop member 12 adapted to admit a fishing line therein. Ring 13 is adapted to suitably slide over rod 11 in accordance with the expansion and contraction of spring 19 one end of which abuts cross-bar 22' which is pivotally connected at 27 and 28 with the oppositely positioned links 20 and 21. The other end of spring 19 abuts the bottom portion of ring 13, which ring is permanently secured to the laterally extending projections 14 and 51. Spring 19 acts to bias ring 13 up against loop member 12. A metalic arm 17 having a barbed hook 25 integrally secured thereto is swingably secured at 15 to the outer end of projection 14. Arm 18 having a barbed hook 26 affixed thereto at one end is, at its other end, swingably secured at 16 to the outer end of projection 51. Links 20 and 21 are pivotably secured at 22 and 50 respectively with their respective arms 17 and 18. Also, barbed hooks 24 are attached to the lower end of rod 11.

Looking now at FIGURE 1 of the drawing, one will see that when a fish strikes the bait, the ring 13 is drawn away from the fishing line, sliding down rod 11 against the force of spring 19 and thus moving barbed hooks 25 and 26 outwardly to engage the fish. The fish invariably becomes hooked securely in this manner, making it impossible to disengage from barbed hooks 24, 25 and 26.

The modified form of this invention provides for an elongated pin 29, one end of which is provided with a loop 30 for admitting a fishing line therein and the other end is firmly attached to a cross-bar 47. Ring 31 is provided with outwardly extending projections 32 and 33 which, in turn, are pivotally secured at 34 and 35 to elongated arms 36 and 38. A helical spring 40 encloses pin 29 and resiliently abuts ring 31 and cross-bar 47. A link 43 is provided with loops 41 and 45 pivotally engaging arm 38 and cross-bar 47 for causing lateral expansions and retractions of arm 38. A link 44 is provided with similarly disposed loops 42 and 46 pivotally engaging arm 36 and cross-bar 47 for causing lateral expansion and retraction of arm 36. Arms 36 and 38 are provided with barbed hooks 37 and 39, respectively.

Figure 2:
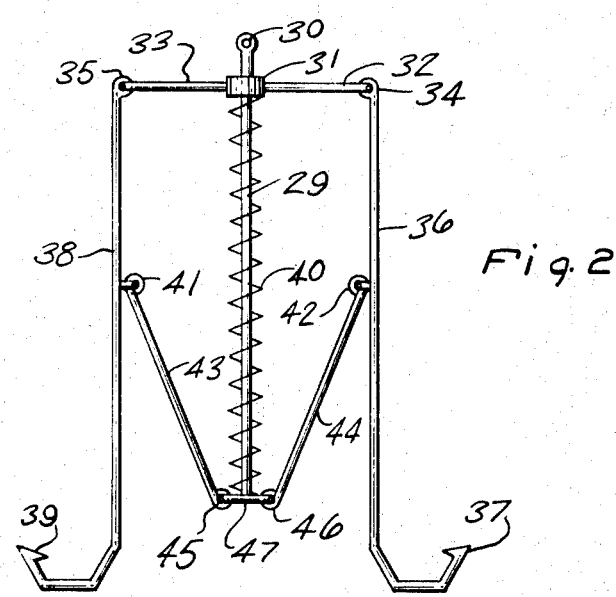
FIGURE 2 is a modified form of this invention.

It will also be noted that the modified arrangement as shown in FIGURE 2 is within the scope of this invention, except that pin 29 does not protrude through cross-bar 47 and is not provided with a pair of barbed hooks.

What I now claim is:
1. A fishing device comprising:
   (a) an elongated rod having means at one end for being connected to a fishing line,
   (b) a ring member slideably positioned on said rod,
   (c) a pair of laterally extending projections, each secured at one end to said ring member,
   (d) a pair of hooked arms, each being swingably connected at one end to the other end of each of said projections, the other end of each of said hooked arms including a hook member,
   (e) a cross-bar fixedly attached adjacent the other end of said rod,
   (f) means biasing said ring member away from said cross-bar, and
   (g) a pair of rigid links, each being pivotally connected at one end to said cross-bar and at the other end to an intermediate position on one of said hooked arms,
   (h) whereby a pulling force applied to said hooks against a fishing line attached to said device will cause said ring member to slide down said rod against the resistance of said biasing means, thereby extending said hooks laterally away from said rod.

2. A fishing device as defined in claim 1 wherein said connecting means comprises a loop formed in the one end of said rod.

3. A fishing device as defined in claim 1 wherein said biasing means comprises an elongated helical spring enclosing said rod, having one end bearing against said cross-bar and the other end bearing against said ring member.

4. A fishing device as defined in claim 1 wherein said hook members comprise conventional barbed fishing hooks.

5. A fishing device as defined in claim 1 further including an additional hook member attached to the other end of said rod.

References Cited

UNITED STATES PATENTS

| | | | |
|---|---|---|---|
| 13,081 | 6/1855 | Cook | 43—36 |
| 700,993 | 5/1902 | Taylor | 43—36 |
| 834,307 | 10/1906 | Landon | 43—36 |
| 1,333,564 | 3/1920 | Murray | 43—37 |
| 2,572,817 | 10/1951 | Reed | 43—35 |

WARNER H. CAMP, *Primary Examiner.*

U.S. Cl. X.R.

43—37